(12) United States Patent
Yang et al.

(10) Patent No.: US 10,684,647 B2
(45) Date of Patent: Jun. 16, 2020

(54) ELECTRONIC APPARATUS AND ENGAGING MECHANISM WITH DIFFERENT ENGAGING DIRECTIONS

(71) Applicants: Wei-Che Yang, Taipei (TW); Wei-Pin Chuang, Taipei (TW); Hsin-Yang Wang, Taipei (TW); Wei-Jen Lin, Taipei (TW); Mu-Chih Yu, Taipei (TW)

(72) Inventors: Wei-Che Yang, Taipei (TW); Wei-Pin Chuang, Taipei (TW); Hsin-Yang Wang, Taipei (TW); Wei-Jen Lin, Taipei (TW); Mu-Chih Yu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/045,768

(22) Filed: Jul. 26, 2018

(65) Prior Publication Data

US 2019/0361497 A1 Nov. 28, 2019

(30) Foreign Application Priority Data

May 24, 2018 (TW) .............................. 107117787 A (51) Int. Cl.
*G06F 1/16* (2006.01)
*E05D 7/10* (2006.01)

(52) U.S. Cl.
CPC ......... *G06F 1/1632* (2013.01); *E05D 7/1066* (2013.01); *G06F 1/1679* (2013.01);
(Continued)

(58) Field of Classification Search
CPC ........................... G06F 1/1632; E05D 7/1066
See application file for complete search history.

(56) References Cited

U.S. PATENT DOCUMENTS

| 2005/0057894 A1* | 3/2005 | Kim | ...................... G06F 1/1616 |
| | | | 361/679.27 |
| 2005/0168422 A1* | 8/2005 | Oh | .................... G02F 1/133308 |
| | | | 345/87 |

(Continued)

FOREIGN PATENT DOCUMENTS

| CN | 207049186 | 2/2018 |
| CN | 207301864 | 5/2018 |

OTHER PUBLICATIONS

Office Action of Taiwan Counterpart Application, dated Jan. 25, 2019, pp. 1-14.

*Primary Examiner* — Daniel P Wicklund
*Assistant Examiner* — Douglas R Burtner
(74) *Attorney, Agent, or Firm* — JCIPRNET (57) ABSTRACT

An electronic apparatus includes an electronic device and a base. The electronic device has an engaging portion with at least two engaging concaves. The base has an engaging mechanism which includes a main body, at least one second engaging bump and a linkage structure. The main body has a first engaging bump. The second engaging bump is movably disposed on the main body and is adapted to move between an engaging position and a releasing position. The electronic device combines with the base such that the first engaging bump and the second engaging bump are engaged with the two engaging concaves. The linkage structure on the main body is connected to the second engaging bump. The electronic device rotates relative to the base to push the linkage structure that drives the second engaging bump from the engaging position to the releasing position to disengage from the engaging portion.

18 Claims, 7 Drawing Sheets

(52) U.S. Cl.
CPC ...... *G06F 1/1681* (2013.01); *E05Y 2900/606* (2013.01); *G06F 1/1626* (2013.01)

(56) References Cited

U.S. PATENT DOCUMENTS

| | | | | |
|---|---|---|---|---|
| 2005/0248501 A1* | 11/2005 | Kim | ...................... | G06F 1/1616 |
| | | | | 345/1.1 |
| 2008/0189463 A1* | 8/2008 | Lee | ...................... | G06F 1/1632 |
| | | | | 710/304 |
| 2010/0149748 A1* | 6/2010 | Lam | ...................... | G06F 1/1632 |
| | | | | 361/679.41 |
| 2011/0310548 A1* | 12/2011 | Ahn | ...................... | G06F 1/1626 |
| | | | | 361/679.21 |
| 2013/0170131 A1* | 7/2013 | Yen | ...................... | G06F 1/1632 |
| | | | | 361/679.44 |
| 2013/0219661 A1* | 8/2013 | Ge | ...................... | G06F 1/1681 |
| | | | | 16/367 |
| 2013/0329360 A1* | 12/2013 | Aldana | ................ | G06F 1/1626 |
| | | | | 361/679.56 |
| 2014/0063703 A1* | 3/2014 | Kim | ...................... | G06F 1/1632 |
| | | | | 361/679.01 |
| 2014/0146458 A1* | 5/2014 | Zhao | ........................ | G06F 1/16 |
| | | | | 361/679.07 |
| 2014/0285960 A1* | 9/2014 | Sharma | ................ | G06F 1/1654 |
| | | | | 361/679.28 |
| 2015/0060622 A1* | 3/2015 | Yeh | ........................ | F16M 13/02 |
| | | | | 248/309.1 |
| 2015/0378399 A1* | 12/2015 | Grinstead | ............. | G06F 1/1681 |
| | | | | 361/679.09 |
| 2017/0220076 A1* | 8/2017 | Gerbus | ................ | G06F 1/1669 |

\* cited by examiner

ELECTRONIC APPARATUS AND ENGAGING MECHANISM WITH DIFFERENT ENGAGING DIRECTIONS

CROSS-REFERENCE TO RELATED APPLICATION

This application claims the priority benefit of Taiwan application serial no. 107117787, filed on May 24, 2018. The entirety of the above-mentioned patent application is hereby incorporated by reference herein and made a part of this specification.

BACKGROUND OF THE INVENTION

1. Field of the Invention

The invention relates to an electronic apparatus and an engaging mechanism, and more particularly to a combined electronic apparatus and an engaging mechanism thereof.

2. Description of Related Art

With rapid developments in technology, portable electronic devices such as tablets, smartphones, etc. are widely used due to the advantages of their portability and ease-of-use. Since a portable electronic device generally does not have a supporting base or a keyboard, the current design is to combine a portable electronic device with a docking station to form a combined electronic apparatus. The docking station has the function of holding and charging the portable electronic device and further includes a keyboard for a user to input data.

Among the docking stations, some portable electronic devices are secured with the fixed structures (such as the hook or latch structure). However, if the portable electronic device is combined with the docking station by the removable fixed structure, the user may experience an operability issue by unexpectedly disengaging the portable electronic device from the docking station with an inappropriate application of force.

SUMMARY OF THE INVENTION

The invention provides an electronic apparatus and an engaging mechanism capable of preventing an electronic device from disengaging from a base unexpectedly.

The electronic apparatus according to the invention includes the electronic device and the base. The electronic device has an engaging portion having at least two engaging concaves. The base has an engaging mechanism, which includes a main body, at least one second engaging bump and a linkage structure. The main body has a first engaging bump. The second engaging bump is movably disposed on the main body and is adapted to move between an engaging position and a releasing position. The electronic device is adapted to combine with the base to engage the first engaging bump and the second engaging bump that is located in the engaging position with the two engaging concaves respectively. The linkage structure is disposed on the main body and is connected to the second engaging bump. The electronic device is adapted to rotate relative to the base to push the linkage structure so as to drive the second engaging bump from the engaging position to the releasing position to disengage from the engaging portion.

The engaging mechanism according to the invention includes a main body and a linkage structure. The main body has a first engaging bump. A second engaging bump is movably disposed on the main body and is adapted to move between an engaging position and a releasing position. The first engaging bump and the second engaging bump that is located in the engaging position are adapted to be engaged with the two engaging concaves of an electronic device respectively. The linkage structure is disposed on the main body and is connected to the second engaging bump. The electronic device is adapted to push the linkage structure to drive the second engaging bump from the engaging position to the releasing position to disengage from the electronic device.

In one embodiment of the invention, when an unfolding angle of the electronic device relative to the base is equal to a preset angle, the electronic device contacts the linkage structure; when the unfolding angle of the electronic device relative to the base is greater than the preset angle, the electronic device pushes the linkage structure.

In one embodiment of the invention, the above electronic device includes a main body and a pivot member. The main body is pivoted to the pivot member that forms the engaging portion.

In one embodiment of the invention, when the first engaging bump partially enters the corresponding engaging concave, the engaging portion pushes the second engaging bump from the engaging position to the releasing position, and when the first engaging bump completely enters the corresponding engaging concave, the second engaging bump is aligned with the corresponding engaging concave and is adapted to enter the corresponding engaging concave.

In one embodiment of the invention, a protruding direction of the above first engaging bump is different from a protruding direction of the second engaging bump.

In one embodiment of the invention, a depth direction of one of the above two engaging concaves is different from a depth direction of the other of the two engaging concaves.

In one embodiment of the invention, a number of the at least two engaging concaves is greater than two, and the first engaging bump and the second engaging bump are adapted to be engaged with any of the two engaging concaves respectively.

In one embodiment of the invention, the above engaging mechanism includes an elastic member that is connected between the linkage structure and the main body of the base. The linkage structure positions the second engaging bump in the engaging position with an elastic force of the elastic member, and the electronic device is adapted to resist the elastic force of the elastic member to push the linkage structure so as to drive the second engaging bump to move to the releasing position.

In one embodiment of the invention, the above main body has a guiding groove. The second engaging bump is slidably mounted inside the guiding groove and is adapted to protrude from the guiding groove to be located in the engaging position and is adapted to retract into the guiding groove to be located in the releasing position.

In one embodiment of the invention, a number of the at least one second engaging bump is two, and a protruding direction of one of the two second engaging bumps is different from a protruding direction of the other of the two second engaging bumps.

In one embodiment of the invention, the above linkage structure includes a drive lever and a driven assembly. The drive lever is pivoted to the main body and is adapted to be pushed by the electronic device. The driven assembly is connected between the drive lever and the second engaging bump.

In one embodiment of the invention, the above drive lever has a push portion, a first pivot portion and a second pivot portion. The push portion and the first pivot portion are located on opposite sides of the drive lever respectively. The push portion is adapted to be pushed by the electronic device, the first pivot portion is pivoted to the driven assembly, and the second pivot portion is located between the push portion and the first pivot portion and is pivoted to the main body.

In view of the foregoing, in the engaging mechanism of the base according to embodiments of the invention, the first engaging bump and the second engaging bump are engaged with the two engaging concaves of the electronic device respectively, and the second engaging bump is movable. Accordingly, it is possible that the first engaging bump is first engaged with a corresponding engaging concave with the electronic device combining with the base, and then the second engaging bump is engaged with the corresponding engaging concave in a different engaging direction from the first engaging bump such that the electronic device securely combines with the base through two different engaging directions to prevent the electronic device from disengaging from the base unexpectedly. Additionally, the linkage structure of the engaging mechanism may be pushed by the electronic device to drive the second engaging bump away from the engaging portion of the electronic device such that a user may disengage the electronic device from the base by increasing the unfolding angle of the electronic device, thereby facilitating the disengagement of the electronic device from the base.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
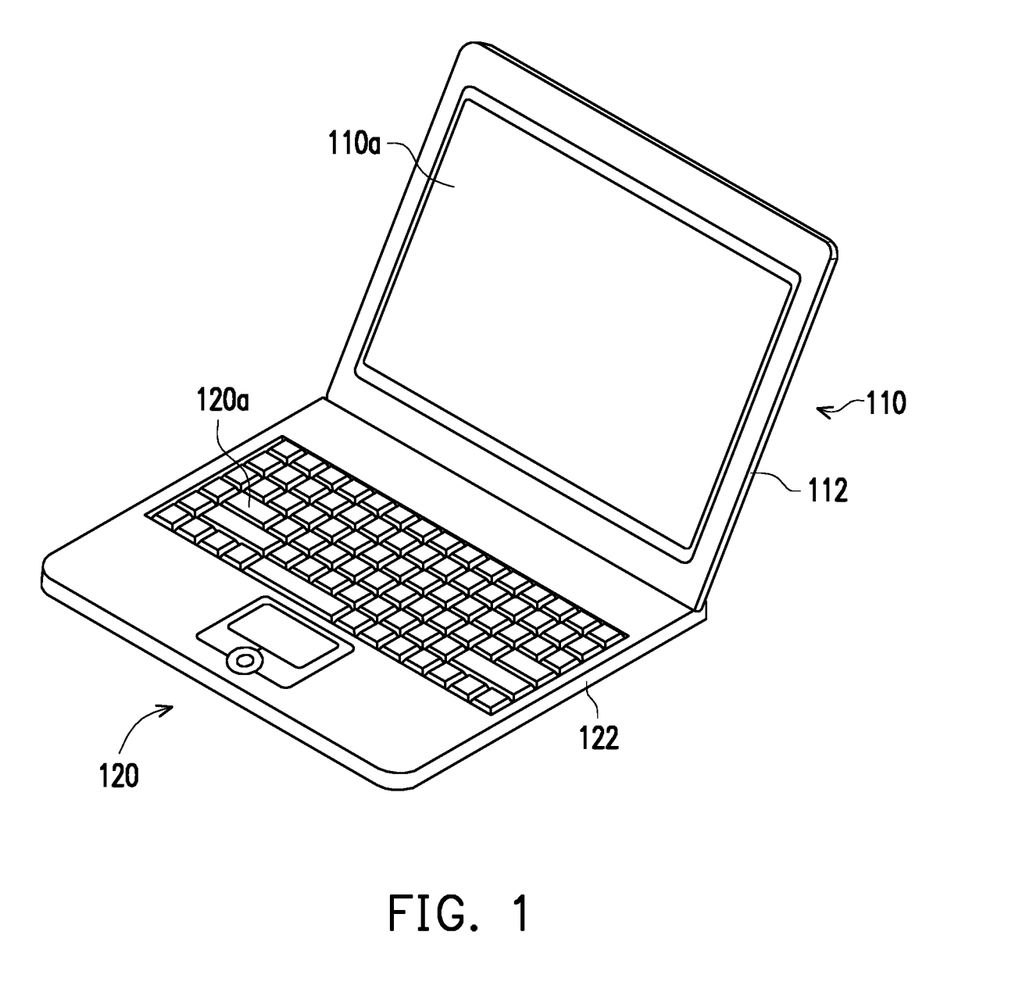
FIG. 1 is a perspective view of an electronic apparatus according to an embodiment of the invention.

FIG. 1 is a perspective view of an electronic apparatus according to an embodiment of the invention. Referring to FIG. 1, an electronic apparatus 100 according to the embodiment of the invention includes an electronic device 110 and a base 120. The electronic device 110 and the base 120 may be, for example, a tablet computer and a corresponding docking station respectively. The base 120 has an input interface 120a (e.g., a keyboard module) for a user to operate, and the electronic device 110 has a touchscreen interface 110a (e.g., a touchscreen interface of a liquid crystal display screen) for use. In other embodiments, the electronic device 110 may be other type of devices, and the base 120 may be a base corresponding to the device, but is not limited thereto.

Figure 2:
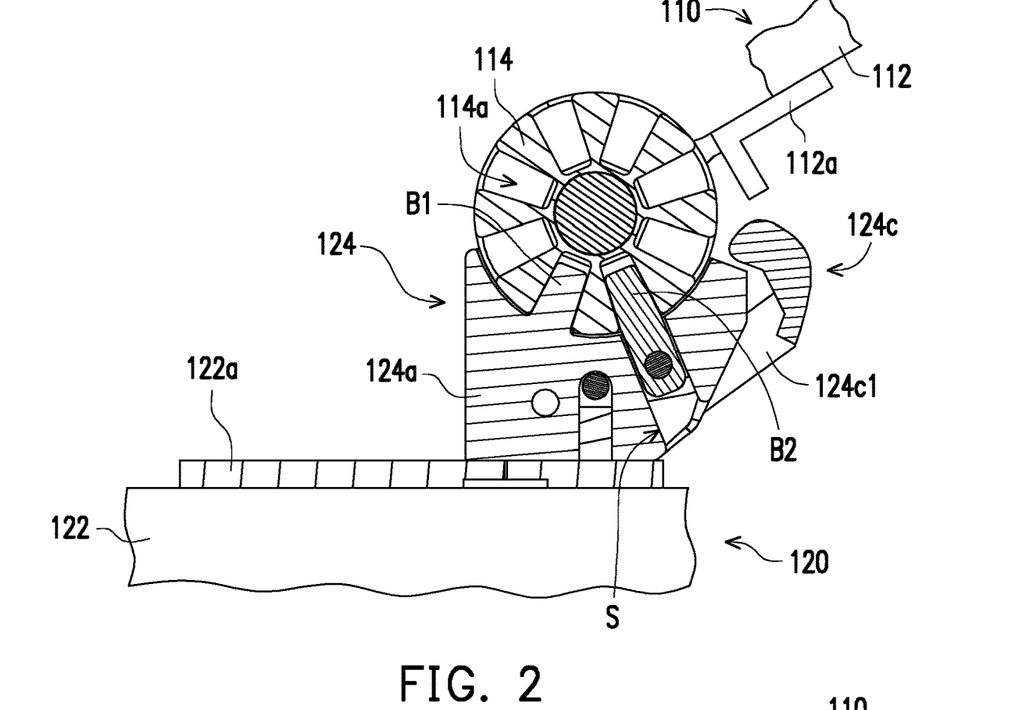
FIG. 2 is a side view of a partial structure of the electronic apparatus of FIG. 1.
Figure 3:
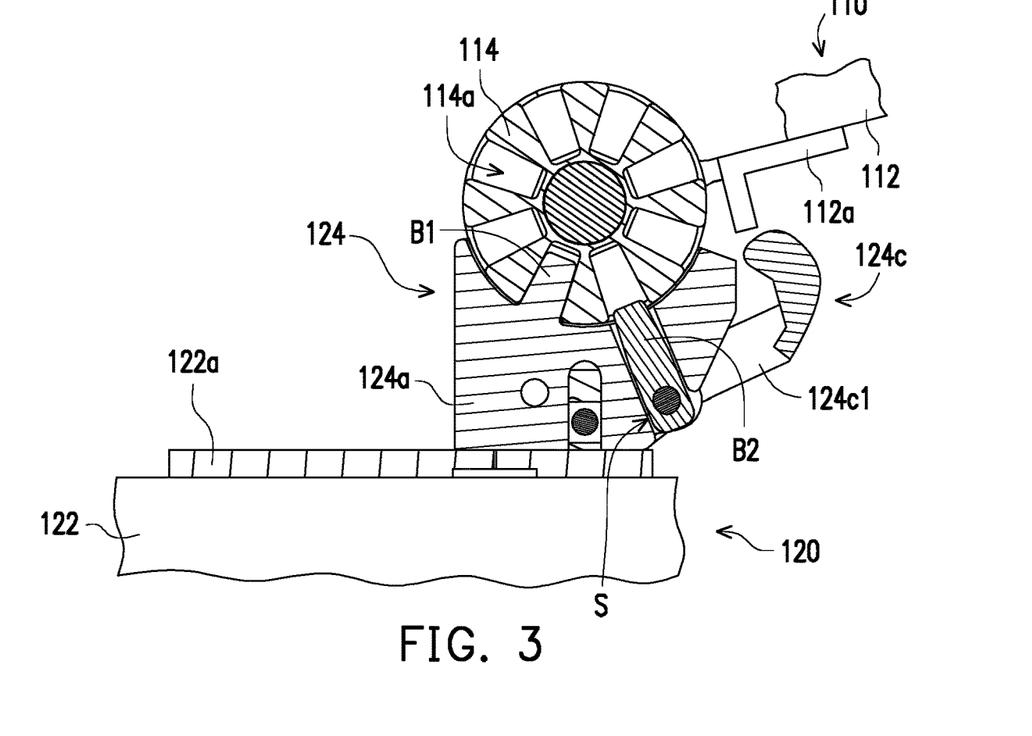
FIG. 3 illustrates that the second engaging bump of FIG. 2 is moved to a releasing position.
Figure 4:
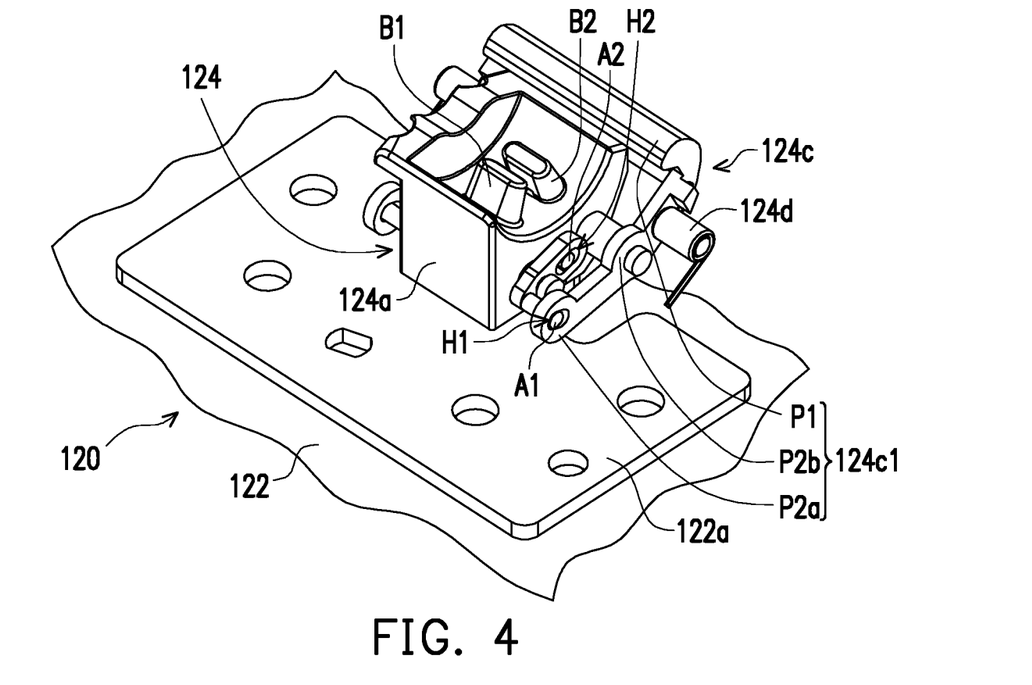
FIG. 4 is a perspective view of a partial structure of the base of FIG. 1.
Figure 5:
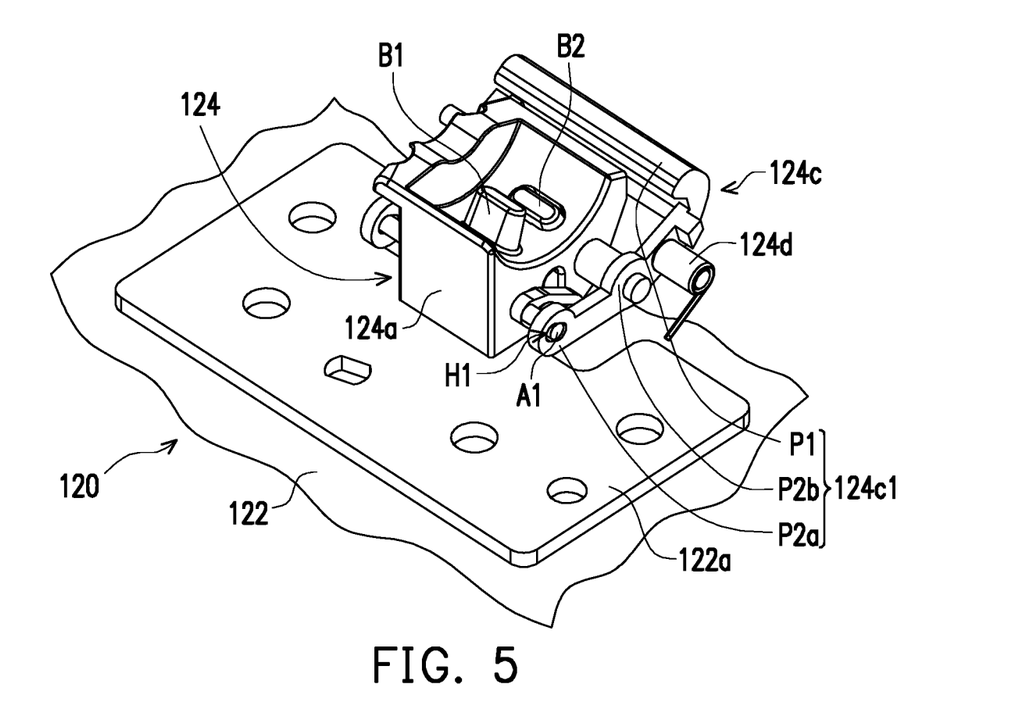
FIG. 5 illustrates that the second engaging bump of FIG. 4 is moved to the releasing position.

FIG. 2 is a side view of a partial structure of the electronic apparatus of FIG. 1. FIG. 3 illustrates that a second engaging bump of FIG. 2 is moved to a releasing position. FIG. 4 is a perspective view of a partial structure of the base of FIG. 1. FIG. 5 illustrates that the second engaging bump of FIG. 4 is moved to the releasing position. Referring to FIGS. 2-5, the electronic device 110 according to the embodiment includes a body 112 and a pivot member 114. The body 112 is pivoted to the pivot member 114 through a bracket 112a. The base 120 includes a main body 122 and an engaging mechanism 124. The main body 122 is connected to the engaging mechanism 124 through a bracket 122a. The electronic device 110 may combine with the base 120 through the engaging mechanism 124.

Specifically, the pivot member 114 of the electronic device 110 forms an engaging portion of the engaging mechanism 124. The engaging portion has a plurality of engaging concaves 114a. The engaging concaves 114a are radially arranged from the perspectives shown in FIGS. 2 and 3 to make a depth direction of each of the engaging concaves 114a different from a depth direction of the other engaging concaves 114a. The engaging mechanism 124 of the base 120 includes a main body 124a, a second engaging bump B2 and a linkage structure 124c. The main body 124a of the engaging mechanism 124 has a first engaging bump B1. A protruding direction of the first engaging bump B1 differs from a protruding direction of a second engaging bump B2. The second engaging bump B2 is movably disposed on the main body 124a of the engaging mechanism 124 and is adapted to move between the engaging positions shown in FIGS. 2 and 4 and the releasing positions shown in FIGS. 3 and 5. The electronic device 110 is adapted to combine with the base 120 to allow the first engaging bump B1 and the second engaging bump B2 that is located in the engaging position to be engaged with any of the two engaging concaves 114a of the pivot member 114 respectively, as shown in FIG. 2.

Figure 6A:
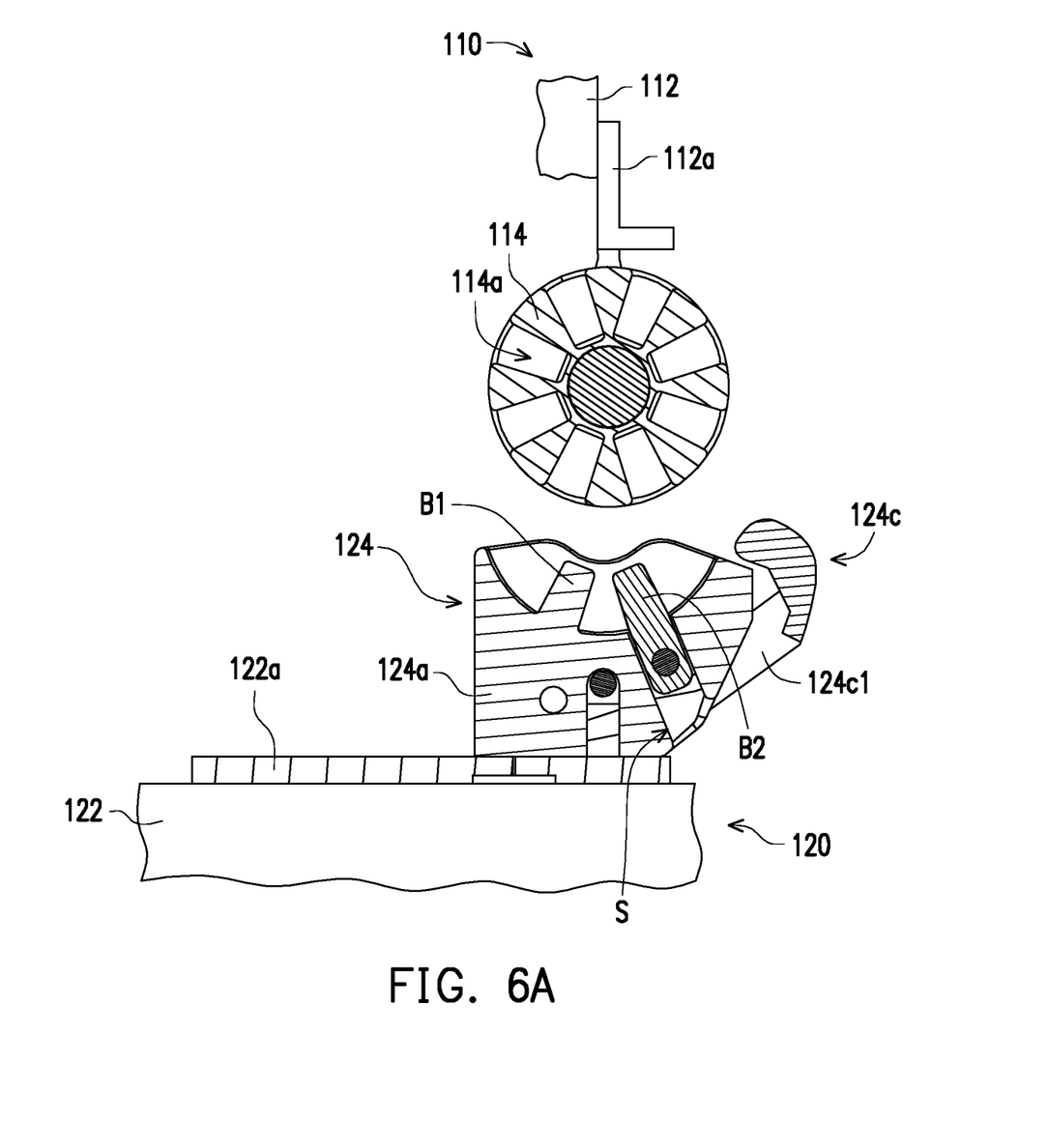
FIGS. 6A and 6B illustrate operational procedures of the engaging mechanism and the engaging portion of FIG. 2.
Figure 6B:
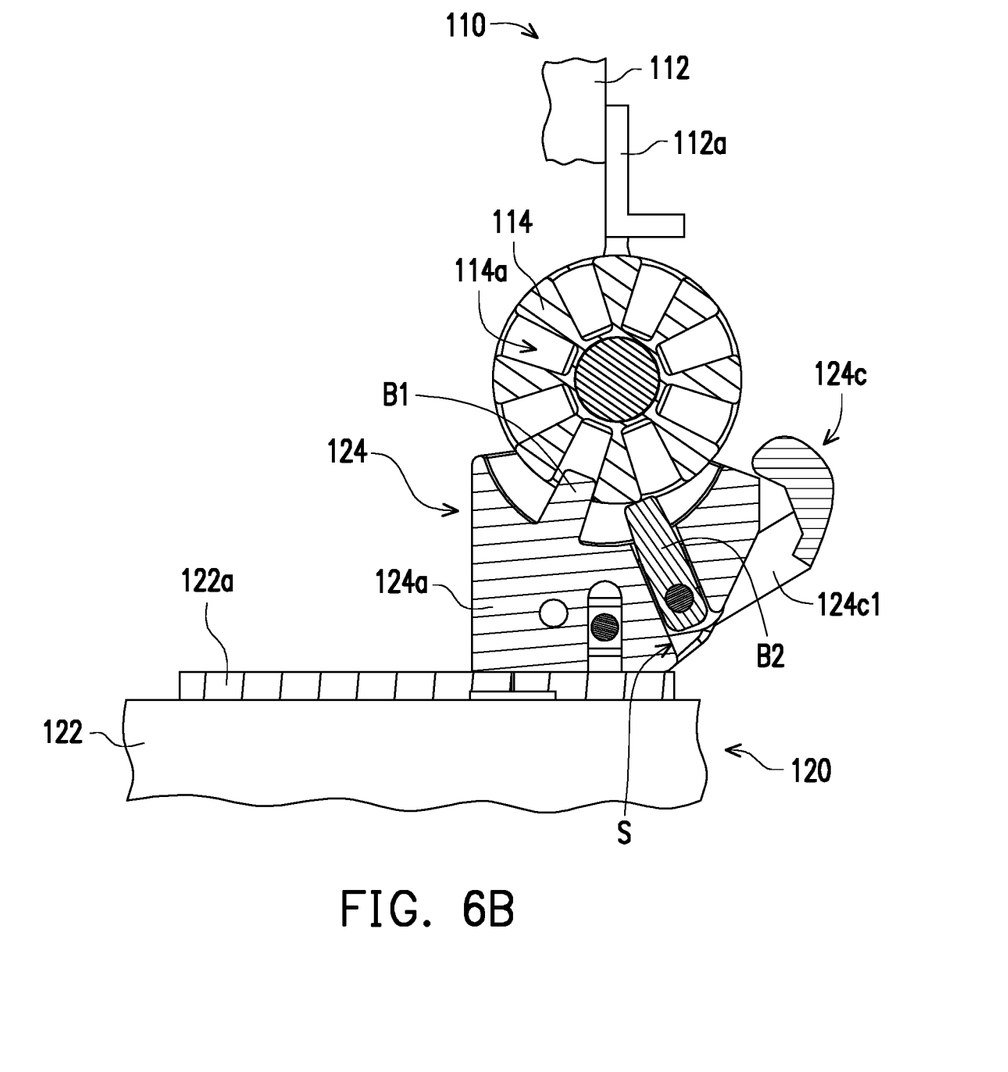

FIGS. 6A and 6B illustrate operational procedures of the engaging mechanism and the engaging portion of FIG. 2. As shown in FIGS. 6A and 6B, a user may allow the first engaging bump B1 to be engaged with the corresponding engaging concave 114a with the electronic device 110 combining with the base 120. During the process, when the first engaging bump B1 partially enters the corresponding engaging concave 114a, as shown in FIG. 6B, the pivot member 114 (i.e., the engaging portion) pushes the second engaging bump B2 from the engaging position to the releasing position. Subsequently, when the first engaging bump B1 completely enters the corresponding engaging concave 114a, the second engaging bump B2 is aligned with the corresponding engaging concave 114a and is adapted to enter the corresponding engaging concave 114a in a different engaging direction from the first engaging bump B1, as shown in FIG. 2. In this case, the electronic device 110 firmly combines with the base 120 through two different engaging directions to prevent the electronic device 110 from disengaging from the base 120 unexpectedly.

On the other hand, the linkage structure 124c is disposed on the main body 124a of the engaging mechanism 124 and is connected to the second engaging bump B2. The electronic device 110 is adapted to rotate relative to the base 120 to push the linkage structure 124c from a state shown in FIG. 2 to a state shown in FIG. 3 such that the second engaging bump B2 is pushed to move from the engaging position shown in FIG. 2 to the releasing position shown in FIG. 3 to disengage from the pivot member 114 (i.e., the engaging portion). The user now may move the electronic device 110 upward to disengage the pivot member 114 (i.e., the engaging portion) from the first engaging bump B1, as shown in FIG. 6A, as to disengage the electronic device 110 from the base 120. The above disengagement process is done such that the electronic device 110 is disengaged with the base 120 by increasing an unfolding angle of the electronic device 110. It is more convenient to use such disengagement process than to use a switch or an unlock button that is additionally mounted.

In detail, when an unfolding angle of the electronic device 110 relative to the base 120 is equal to a preset angle (e.g., 135 degrees) as shown in FIG. 2, the body 112 of the electronic device 110 contacts the linkage structure 124c; when the electronic device 110 continues to unfold until the unfolding angle of the electronic device 110 relative to the base 120 shown in FIG. 3 is greater than the preset angle, the electronic device 110 pushes the linkage structure 124c as described above. It should be illustrated that the bodies 112 of the electronic devices 110 in FIGS. 2 and 3 are merely for illustrative purposes, and the entire structure of the body 112 of the electronic device 110 is not shown. In fact, a partial structure of the body 112 of the electronic device 110 (e.g., a casing of the electronic device 110) contacts the linkage structure 124c in the states in FIGS. 2 and 3.

Referring to FIGS. 4 and 5, the engaging mechanism 124 according to the embodiment includes an elastic member 124d that is, for example, a torsion spring connected between the linkage structure 124c and the main body 122 of the base 120. The linkage structure 124c positions the second engaging bump B2 in the engaging position as shown in FIG. 4 by an elastic force from the elastic member 124d, and the electronic device 110 (shown in FIG. 1) is adapted to resist the elastic force of the elastic member 124d from pushing the linkage structure 124c to move the second engaging bump B2 to the releasing position shown in FIG. 5. When the electronic device 110 no longer pushes the linkage structure 124c, the linkage structure 124c is restored to the original position with the elastic force of the elastic member 124d to restore the second engaging bump B2 to the engaging position in FIG. 4. It should be illustrated that the main bodies 122 of the bases 120 in FIGS. 4 and 5 are merely for illustrative purposes, and the entire structure of the main body 122 of the base is not shown. In fact, a partial structure of the main body 122 of the base 120 (e.g., a casing of the base 120) contacts the elastic member 124d in the states in FIGS. 4 and 5.

Referring to FIGS. 2 and 3, the main body 124a of the engaging mechanism 124 according to the embodiment has a guiding groove S, where the second engaging bump B2 is slidably mounted therein. The second engaging bump B2 is adapted to protrude from the guiding groove S in the engaging position, as shown in FIG. 2 and is adapted to retract into the guiding groove S in the releasing position, as shown in FIG. 3. In other embodiments, the second engaging bump B2 may be movably disposed on the main body 124a of the engaging mechanism 124 by other appropriate methods, but is not limited thereto.

Figure 7:
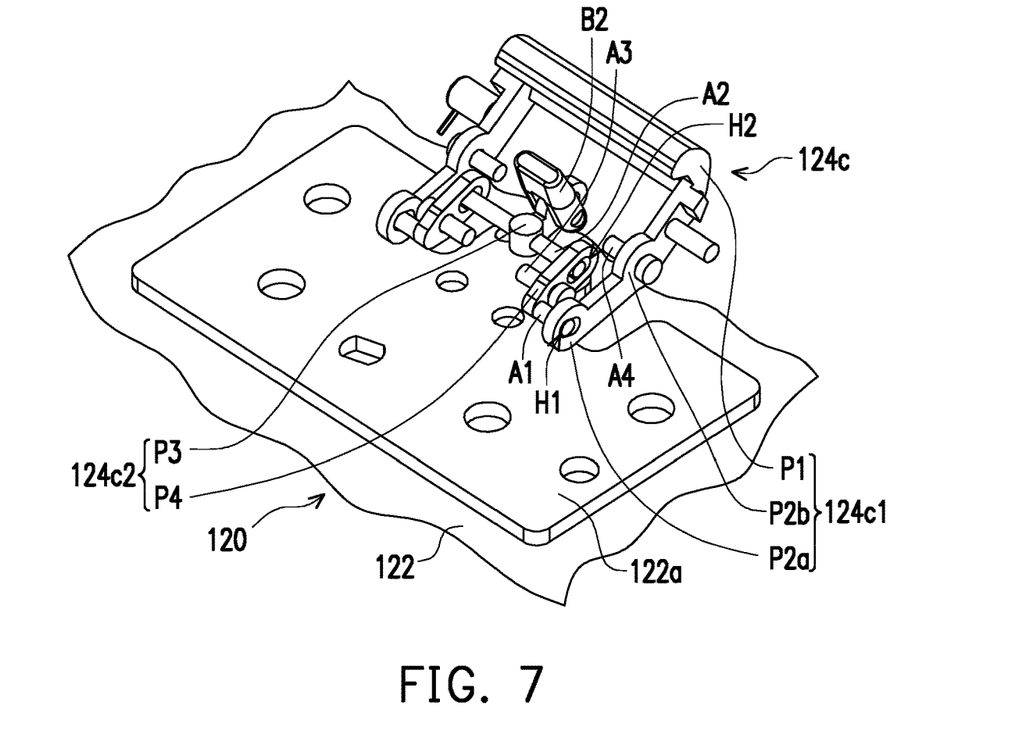
FIG. 7 is a perspective view of a partial structure of the base of FIG. 4.

FIG. 7 is a perspective view of a partial structure of the base of FIG. 4. Referring to FIGS. 4 and 7, in the present embodiment, the linkage structure 124c includes a drive lever 124c1 and a driven assembly 124c2. The drive lever 124c1 has a push portion P1, a first pivot portion P2a and a second pivot portion P2b, where the push potion P1 and the first pivot portion P2a are located on opposite sides of the drive lever 124c1 respectively. The push portion P1 is adapted to be pushed by the electronic device 110, and the second pivot portion P2b is located between the push portion P1 and the first pivot portion P2a and is pivoted to the main body 124a. The driven assembly 124c2 includes driven links P3 and P4 pivoted to each other. The driven link P4 is pivoted to the main body 124a, the first pivot portion P2a is pivoted to the driven link P4, and the driven link P3 is pivoted to the second engaging bump B2.

More specifically, the driven link P4 is connected to a sliding hole H1 of the drive lever 124c1 through a pivot A1 to allow the pivot A1 to rotate and slide within the sliding hole H1. Similarly, the driven link P3 is connected to a sliding hole H2 of the driven link P4 through a pivot A2 to allow the pivot A2 to rotate and slide within the sliding hole H2. Additionally, the driven link P4 is pivoted to the main body 124a through a pivot A3. In this manner, the driven link P4, when driven by the drive lever 124c1, rotates around the pivot A3 to drive the driven link P3 to rotate. The drive lever 124c1 is pivoted to the main body 124a through a pivot A4. The configuration and connecting manner of the linkage structure 124c as shown in FIG. 7 are merely given by example. In other embodiments, the linkage structure 124c may be other appropriate types of linkages for pushing the second engaging bump B2 to move or other types of mechanisms. The invention is not limited to the above embodiments.

Figure 8:
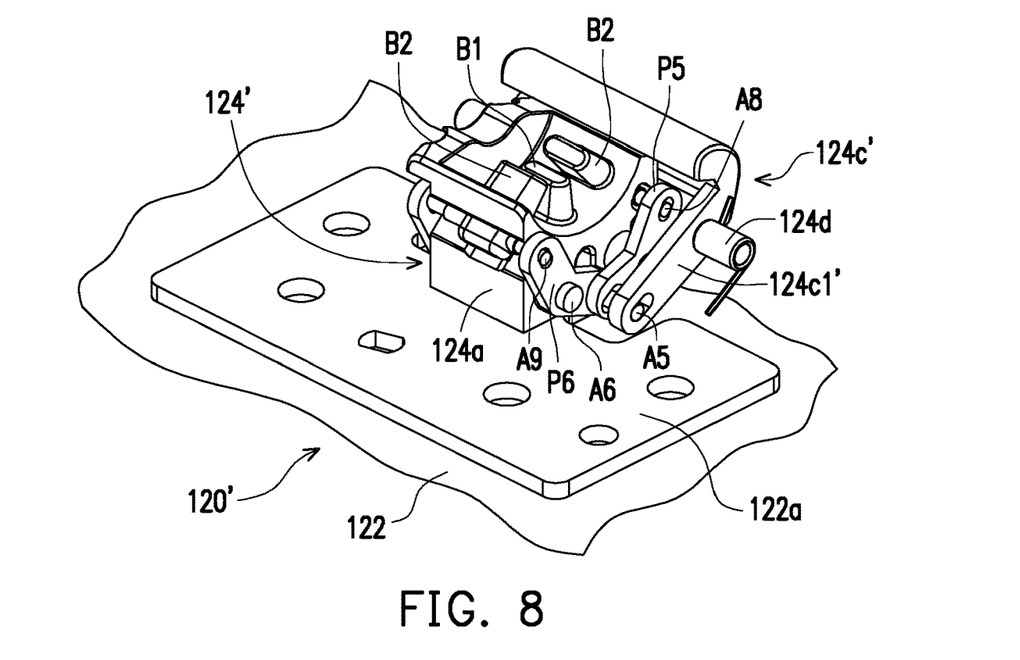
FIG. 8 is a perspective view of a partial structure of a base according to another embodiment of the invention.
Figure 9:
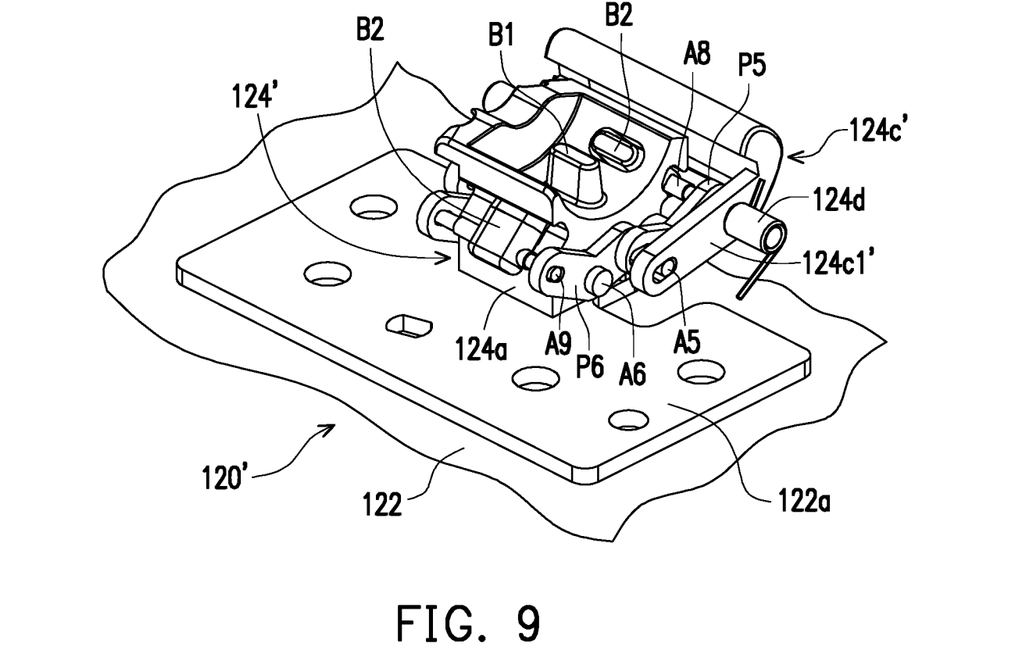
FIG. 9 illustrates that the second engaging bump of FIG. 8 is moved to the releasing position.

FIG. 8 is a perspective view of a partial structure of a base according to another embodiment of the invention. FIG. 9 illustrates that the second engaging bump of FIG. 8 is moved to the releasing position. The differences in the embodiments between FIGS. 8-9 and FIGS. 4-5 lie in that in engaging mechanisms 124' of bases 120' in FIGS. 8 and 9, a number of the second engaging bumps B2 is two, and the two second engaging bumps B2 have different protruding directions to enable the first engaging bump B1 and the two second engaging bumps B2 to have three different engaging directions to combine the electronic device with the base 120' firmly and prevent the electronic device from disengaging from the base 120' unexpectedly.

Figure 10:
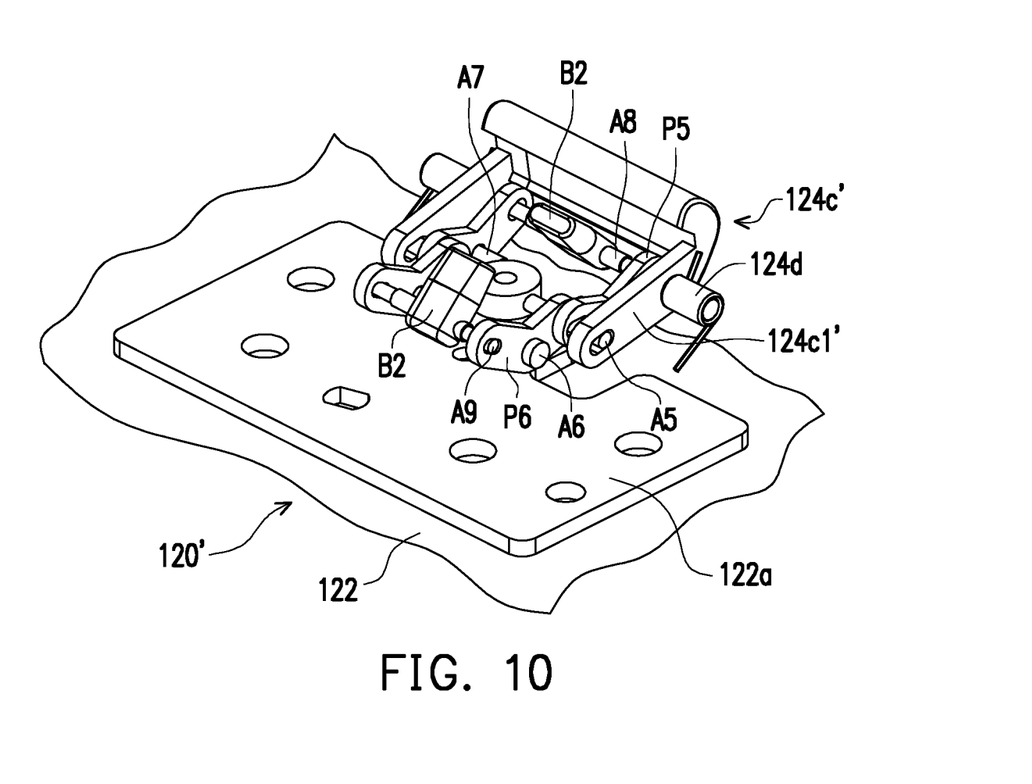
FIG. 10 is a perspective view of a partial structure of the base of FIG. 9.

Below are specific details about the configuration and connecting manner of a linkage structure 124c' according to the embodiments of FIGS. 8 and 9. FIG. 10 is a perspective view of a partial structure of the base of FIG. 9. Referring to FIGS. 8-10, a drive lever 124c1', a driven link P5, and a driven link P6 are pivoted to one another through a pivot A5, the driven link P6 is pivoted to the main body 124a through a pivot A6, the driven link P5 is pivoted to the main body 124a through a pivot A7, and the two second engaging bumps B2 are pivoted to the driven links P5 and P6 through pivots A8 and A9 respectively. The linkage structure 124c' according to the present embodiment is pushed by the electronic device to drive the second engaging bump B2 to move in a similar way to the linkage structure 124c according to the embodiments of FIGS. 4 and 5. Repeated descriptions are omitted. Moreover, the configuration and connecting manner of the linkage structure 124c' in FIG. 10 are merely given by example. In other embodiments, the linkage structure 124c' may be other appropriate types of linkages for pushing the two second engaging bumps B2 to move or other types of mechanisms, but is not limited thereto.

In summary of the above, in the engaging mechanism of the base of the invention, the first engaging bump and the second engaging bump are engaged with the two engaging concaves of the electronic device respectively, and the second engaging bump is movable. Accordingly, it is possible that the first engaging bump is first engaged with the corresponding engaging concave with the electronic device combining with the base, and then the second engaging bump is engaged with the corresponding engaging concave in a different engaging direction from the first engaging bump. In this case, the electronic device combines with the base securely through at least two different engaging directions to prevent the electronic device from disengaging from the base unexpectedly. Additionally, the linkage structure of the engaging mechanism may be pushed by the electronic device to drive the second engaging bump away from the engaging portion of the electronic device, so the user may disengage the electronic device with the base by increasing the unfolding angle of the electronic device, thereby facilitating the disengagement of the electronic device from the base.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic apparatus, comprising:
   an electronic device having an engaging portion, the engaging portion having at least two engaging concaves; and
   a base, having an engaging mechanism, the engaging mechanism including:
      a main body having a first engaging bump;
      at least one second engaging bump, movably disposed on the main body and adapted to move between an engaging position and a releasing position, wherein the electronic device is adapted to combine with the base to engage the first engaging bump and the second engaging bump that is located in the engaging position with the two engaging concaves respectively; and
      a linkage structure, disposed on the main body and connected to the second engaging bump, wherein the electronic device is adapted to rotate relative to the base to push the linkage structure so as to drive the second engaging bump from the engaging position to the releasing position to disengage from the engaging portion,
   wherein when an unfolding angle of the electronic device relative to the base is equal to a preset angle, the electronic device contacts the linkage structure; when the unfolding angle of the electronic device relative to the base is greater than the preset angle, the electronic device pushes the linkage structure.

2. The electronic apparatus according to claim 1, wherein when the first engaging bump partially enters the corresponding engaging concave, the engaging portion pushes the second engaging bump from the engaging position to the releasing position, and when the first engaging bump completely enters the corresponding engaging concave, the second engaging bump is aligned with the corresponding engaging concave and is adapted to enter the corresponding engaging concave.

3. The electronic apparatus according to claim 1, wherein the electronic device includes the main body and a pivot member, the main body being pivoted to the pivot member that forms the engaging portion.

4. The electronic apparatus according to claim 1, wherein a protruding direction of the first engaging bump is different from a protruding direction of the second engaging bump.

5. The electronic apparatus according to claim 1, wherein a depth direction of one of the two engaging concaves is different from a depth direction of the other of the two engaging concaves.

6. The electronic apparatus according to claim 1, wherein a number of the at least two engaging concaves is greater than two, and the first engaging bump and the second engaging bump are adapted to be engaged with any of the two engaging concaves respectively.

7. The electronic apparatus according to claim 1, wherein the engaging mechanism includes an elastic member connected between the linkage structure and the main body of the base, the linkage structure positions the second engaging bump in the engaging position with an elastic force of the elastic member, and the electronic device is adapted to resist the elastic force of the elastic member to push the linkage structure to drive the second engaging bump to the releasing position.

8. The electronic apparatus according to claim 1, wherein the main body includes a guiding groove, and the second engaging bump is slidably mounted inside the guiding groove and is adapted to protrude from the guiding groove to be located in the engaging position and is adapted to retract into the guiding groove to be located in the releasing position.

9. The electronic apparatus according to claim 1, wherein a number of the at least one second engaging bump is two, and a protruding direction of one of the two second engaging bumps is different from a protruding direction of the other of the two second engaging bumps.

10. The electronic apparatus according to claim 1, wherein the linkage mechanism includes a drive lever and a driven assembly, the drive lever being pivoted to the main body and being adapted to be pushed by the electronic device, and the driven assembly being connected between the drive lever and the second engaging bump.

11. The electronic apparatus according to claim 10, wherein the drive lever has a push portion, a first pivot portion and a second pivot portion, the push portion and the first pivot portion are located on opposite sides of the drive lever, the push portion is adapted to be pushed by the electronic device, the first pivot portion is pivoted to the driven assembly, and the second pivot portion is located between the push portion and the first pivot portion and is pivoted to the main body.

12. An engaging mechanism, comprising:
   a main body, having a first engaging bump;
   at least one second engaging bump, movably disposed on the main body and adapted to move between an engaging position and a releasing position, wherein the first engaging bump and the second engaging bump that is located in the engaging position are adapted to be engaged with the two engaging concaves of an electronic device respectively;

a linkage structure, disposed on the main body and connected to the second engaging bump, wherein the electronic device is adapted to push the linkage structure to drive the second engaging bump from the engaging position to the releasing position to disengage from the electronic device; and an elastic member, wherein the elastic member is connected to the linkage structure, the linkage structure positions the second engaging bump in the engaging position with an elastic force of the elastic member, and the electronic device is adapted to resist the elastic force of the elastic member to push the linkage structure so as to drive the second engaging bump to the releasing position.

13. The engaging mechanism according to claim 12, wherein when the first engaging bump partially enters the corresponding engaging concave, an engaging portion pushes the second engaging bump from the engaging position to the releasing position, and when the first engaging bump completely enters the corresponding engaging concave, the second engaging bump is aligned with the corresponding engaging concave and is adapted to enter the corresponding engaging concave.

14. The engaging mechanism according to claim 12, wherein a protruding direction of the first engaging bump is different from a protruding direction of the second engaging bump.

15. The engaging mechanism according to claim 12, wherein the main body has a guiding groove, and the second engaging bump is slidably mounted inside the guiding groove and is adapted to protrude from the guiding groove to be located in the engaging position and is adapted to retract into the guiding groove to be located in the releasing position.

16. The engaging mechanism according to claim 12, wherein a number of the at least one second engaging bump is two, and a protruding direction of one of the two second engaging bumps is different from a protruding direction of the other of the two second engaging bumps.

17. The engaging mechanism according to claim 12, wherein the linkage structure includes a drive lever and a driven assembly, the drive lever being pivoted to the main body and being adapted to be pushed by the electronic device and the driven assembly being connected between the drive lever and the second engaging bump.

18. The engaging mechanism according to claim 17, wherein the drive lever has a push portion, a first pivot portion and a second pivot portion, the push portion and the first pivot portion are located on opposite sides of the drive lever respectively, the push portion is adapted to be pushed by the electronic device, the first pivot portion is pivoted to the driven assembly, and the second pivot portion is located between the push portion and the first pivot portion and is pivoted to the main body.

* * * * *